United States Patent [19]

Mehmke et al.

[11] Patent Number: 4,993,042
[45] Date of Patent: Feb. 12, 1991

[54] DEVICE FOR MOUNTING A WINDOW ON A GAS-DISCHARGE LASER

[75] Inventors: Bernd Mehmke, Bad Sachsa; Gerd Ahlborn, Bovenden, both of Fed. Rep. of Germany

[73] Assignee: Lambda Physik Forschungs-und Entwicklungsgesellschaft, Gottingen, Fed. Rep. of Germany

[21] Appl. No.: 343,028

[22] Filed: Apr. 25, 1989

[30] Foreign Application Priority Data

May 27, 1988 [DE] Fed. Rep. of Germany ....... 3818128

[51] Int. Cl.$^5$ .............................................. H01S 3/08
[52] U.S. Cl. .................................. 372/103; 372/107; 372/99
[58] Field of Search ................... 372/98, 99, 103, 107, 372/108

[56] References Cited

U.S. PATENT DOCUMENTS 4,278,324 10/1979 Zipfel ................................... 372/107
4,879,721 11/1989 Braski et al. ......................... 372/108

FOREIGN PATENT DOCUMENTS 0067644 12/1982 European Pat. Off. ............ 372/107

Primary Examiner—Léon Scott, Jr.
Attorney, Agent, or Firm—Irell & Manella

[57] ABSTRACT

A device for mounting a window on a gas-discharge laser is characterized by a slide 3 which is displaceable transversely of the beam axis A of the laser and on which at least one window 6 can be mounted and which is movable into at least two different positions.

24 Claims, 1 Drawing Sheet

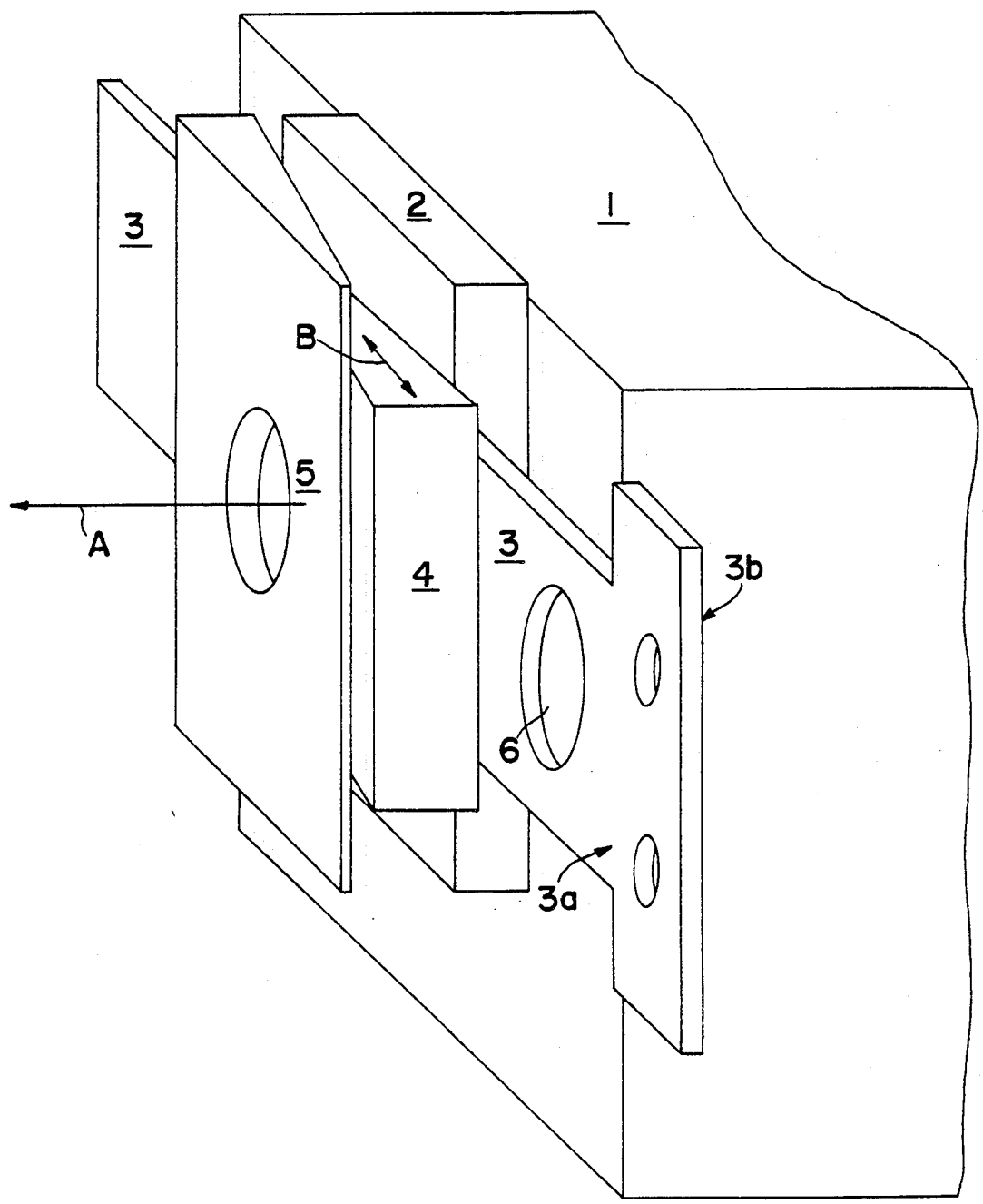

DEVICE FOR MOUNTING A WINDOW ON A GAS-DISCHARGE LASER

The invention relates to a device for mounting a window on a gas-discharge laser.

Pulsed gas-discharge lasers generally comprise discharge chambers in which gas pressures obtain which may be less or greater than the outer atmospheric pressure. Thus, for example $CO_2$ lasers usually operate at a few hundred millibar gas pressure and excimer lasers at a few bar.

The gas mixture in the discharge chamber comprises an exactly defined composition to obtain a good beam quality. Any contamination of the gas mixture, in particular by air constituents (nitrogen, oxygen, water etc.) can detrimentally change the properties of the laser.

As is known, pulsed gas-discharge lasers have at least one window which is permeable to the laser beam and through which the laser beam is coupled out of the discharge chamber. Arrangements are also already known having a plurality of windows permeable to the beam.

The windows must be connected gas-tight to the discharge chamber so that no gas can emerge from the discharge chamber and no gas can penetrate into said chamber from the outside. As a rule, circular windows are employed which are pressed in various manner onto an elastic sealing ring to seal the laser chamber in gas-tight manner.

During operation frequently soiling of the discharge-chamber-side surfaces of the windows cannot be avoided. The cause of such soiling is mainly dust particles which arise by the burning away of the discharge electrodes of the laser. These dust particles deposit inter alia on the inner surfaces of the windows as well where they remain adhering due to electrostatic or other forces.

Another source of the soiling of windows is the impurity molecules present in the laser gas. For example, it is known that in excimer lasers the molecules $CF_4$ and $CCl_4$ are present in the chamber, arising by reactions of the halogen component (fluorine or chlorine) with carbon-containing materials, such as all plastic insulators. Although these molecules are gaseous and consequently do not deposit as soiling on the windows, due to the high intensity of the laser beam in the discharge chamber splitting of the molecules (dissociation) can arise and thus carbon can be formed which can deposit as a film on the inner surfaces of the windows. This process is known in particular in excimer lasers because due to the short wavelengths of the laser and the high peak powers high dissociation rates can occur.

For the above reasons and for other reasons as well it is therefore frequently necessary to clean regularly the inner surface of the windows of gas-discharge lasers or even to replace the windows. To do this, the windows must be dismantled.

In known devices for mounting windows on gas-discharge lasers the replacement or cleaning of the window is relatively complicated. Firstly, the pressure in the discharge chamber must be adapted to the outer air pressure. Then the usual mounting screws with which the window is pressed against a sealing ring on the discharge chamber must be released. The window is then removed together with the sealing ring. Only thereafter can the window be cleaned or a new window inserted. After this, the mounting screws must be tightened again.

During these operations the window opening to the discharge chamber is normally opened for at least half a minute. Thus, air along with its impurities and contaminations, in particular water, can penetrate into the interior of the laser chamber. The humidity of the air reacts with residues of said halogen component to give undesirable compounds which can subsequently interfere with the laser operation. On the other hand, residues of the laser-gas mixture can pass from the laser chamber to the surrounding room and this is extremely undesirable, in particular with excimer lasers with the halogen-containing component, inter alia for health reasons.

A further disadvantage of known devices for mounting windows on gas-discharge lasers resides in that when removing the window a free space is necessary in the direction of the beam axis. If an optical system for guiding the laser beam is disposed directly on the laser then to clean or replace the window this optical system must be disassembled as well and this is not only very time-consuming but can also possibly interfere with a precise setting.

The problem underlying the invention is to provide a device for mounting a window on a gas-discharge laser which permits simple cleaning or replacement of the window and at the same time ensures that the entrance of foreign gases into the laser chamber and also the emergence of gases from the laser chamber are reduced to a minimum.

According to the invention this problem is solved in that the window is arranged in a slide which is displaceable transversely of the beam axis of the laser and which is movable into at least two different positions with respect to the beam axis.

Since the slide according to the invention is displaceable transversely (as a rule 90°) to the beam axis of the laser the window need not be removed in the direction of the beam axis for cleaning or replacement and consequently any optical system disposed immediately in front of the window need not be disassembled.

Preferably, the slide comprises two plane-parallel large-area side faces and the window occupies only a relatively small area with respect to the total area of the slide. The slide can then together with the window be pushed out of the position in which the window closes the window opening of the laser chamber (normal position). In the pushed-out position the window is adequately freely accessible for cleaning or replacement. At the same time with part of its free side area the slide now seals the window opening so that no gas exchange can take place between the interior of the laser chamber and the outer atmosphere. Preferably, the slide in this position is pressed against a sealing ring remaining in its position.

It is also possible to provide the slide with more than one window so that on displacement thereof into different positions different windows can be brought in front of the window opening.

The pressing of the slide against the sealing ring surrounding the window opening is preferably effected with a simple wedge arrangement. It is also possible to press the slide with other means against the sealing ring, for example by means of an eccentric pressure element, screws, etc.

The movement of the slide into the various positions can be effected manually, preferably by means of a lever, electromagnetically, pneumatically or hydraulically.

Hereinafter an example of embodiment of the invention will be explained in detail with the aid of the drawing.

A gas-discharge laser 1 comprises in the region of its window a first guide 2 in which an elastic sealing ring (not shown) known per se is provided. In the operating position of the laser the sealing ring surrounds a window through the centre of which the beam axis A extends.

A slide 3 with large-area side faces 3a and 3b is displaceable in the direction of the arrow B perpendicularly to the beam axis A. In the position shown in the Figure a window 6 is moved out of the operating position so that it is accessible for cleaning or replacement.

According to the FIGURE two wedge elements, 4, 5 are further provided, the inner wedge element 4 of which is also displaceable in the direction of the arrow B. If the wedge 4 is displaced in the direction towards the beam axis it presses the slide 3 against the sealing ring in the guide element 2. In the position shown in the Figure the slide 3 then seals the window opening in the guide element 2. When the window 6 in the Figure has been pushed rearwardly out of the position shown into the operating position the wedge 4 presses the window 6 against the sealing ring so that the discharge chamber of the laser 1 is likewise sealed in air-tight manner. It is obvious that the wedge 4 like the wedge 5 illustrated has a substantially central opening through which the laser beam can emerge.

Thus, for removal or cleaning of the window, after the gas pressure in the laser chamber has been adapted to the outer atmospheric pressure the wedge 4 is displaced to cancel the application pressure of the window on the sealing ring. The wedge 4 can be displaced with a lever. It is also possible to actuate the wedge by means of screws or electromagnetically or pneumatically or hydraulically.

When the application pressure of the window 6 on the sealing ring has been released the slide 3 together with the window 6 is withdrawn until the window is freely accessible. In this position of the slide 3 the wedge 4 can now again be brought into the working position, the slide thereby being pressed by a continuous closed area or with another window (not shown) against the sealing ring.

The possibly soiled window 6 can be cleaned or replaced.

The entire operation of releasing the wedge 4, displacing the slide 3 and returning the wedge 4 into the working position does not take up more than 1 to 2 seconds. The gas exchange between the interior of the laser chamber and the outer atmosphere is reduced to a minimum.

After the cleaning or replacement of the window 6 the wedge 4 is released again, the slide 3 with the clean window brought into the operating position and the wedge 4 again pressed into the working position.

We claim:

1. A device for mounting a window (6) on a gas-discharge laser (1), characterized by a slide (3) which is displaceable transversely of the beam axis (A) of the laser and at least one window (6) on said slide, wherein said slide is positionable in at least two different positions with respect to the beam axis (A), such that in a first said position the window (6) is aligned with the beam axis (A) and in a second said position the window (6) is not aligned with the beam axis (A) thereby providing for removal and cleaning of the window (6).

2. A device according to claim 1, characterized in that the slide (3) comprises two plane-parallel large area side faces (3a, 3b).

3. A device according to claim 2, characterized in that the slide (3) is positionable between the various positions by a lever.

4. A device according to claim 3, characterized in that the slide (3) is pressed by means of a wedge arrangement (4, 5) against a sealed ring.

5. A device according to claim 3, characterized in that the slide (3) is pressed by means of a lever against a sealing ring.

6. A device according to claim 2, characterized in that the slide (3) is positionable between the various positions electromagnetically.

7. A device according to claim 6, characterized in that the slide (3) is pressed by means of a wedge arrangement (4, 5) against a sealing ring.

8. A device according to claim 6, characterized in that the slide (3) is pressed by means of a lever against a sealing ring.

9. A device according to claim 2, characterized in that the slide (3) is positionable between the various positions pneumatically or hydraulically.

10. A device according to claim 9, characterized in that the slide (3) is pressed by means of a wedge arrangement (4, 5) against a sealing ring.

11. A device according to claim 9, characterized in that the slide (3) is pressed by means of a lever against a sealing ring.

12. A device according to claim 2, characterized in that the slide (3) is pressed by means of a wedge arrangement (4, 5) against a sealing ring.

13. A device according to claim 2, characterized in that the slide (3) is pressed by means of a lever against a sealing ring.

14. A device according to claim 1 characterized in that the slide (3) is positionable between the various positions by a lever.

15. A device according to claim 8, characterized in that the slide (3) is pressed by means of a wedge arrangement (4, 5) against a sealing ring.

16. A device according to claim 14, characterized in that the slide (3) is pressed by means of a lever against a sealing ring.

17. A device according to claim 1 characterized in that the slide (3) is positionable between the various positions electromagnetically.

18. A device according to claim 15, characterized in that the slide (3) is pressed by means of a wedge arrangement (4, 5) against a sealing ring.

19. A device according to claim 17, characterized in that the slide (3) is pressed by means of a lever against a sealing ring.

20. A device according to claim 1 characterized in that the slide (3) is positionable between the various positions pneumatically or hydraulically.

21. A device according to claim 20, characterized in that the slide (3) is pressed by means of a wedge arrangement (4, 5) against a sealing ring.

22. A device according to claim 20, characterized in that the slide (3) is pressed by means of a lever against a sealing ring.

23. A device according to claim 1, characterized in that the slide (3) is pressed by means of a wedge arrangement (4, 5) against a sealing ring.

24. A device according to claim 1, characterized in that the slide (3) is pressed by means of a lever against a sealing ring.

* * * * *